May 10, 1949.  G. COBY  2,469,681
GLASS TUBE BOTTOMING MACHINE
Filed May 27, 1943  3 Sheets-Sheet 1
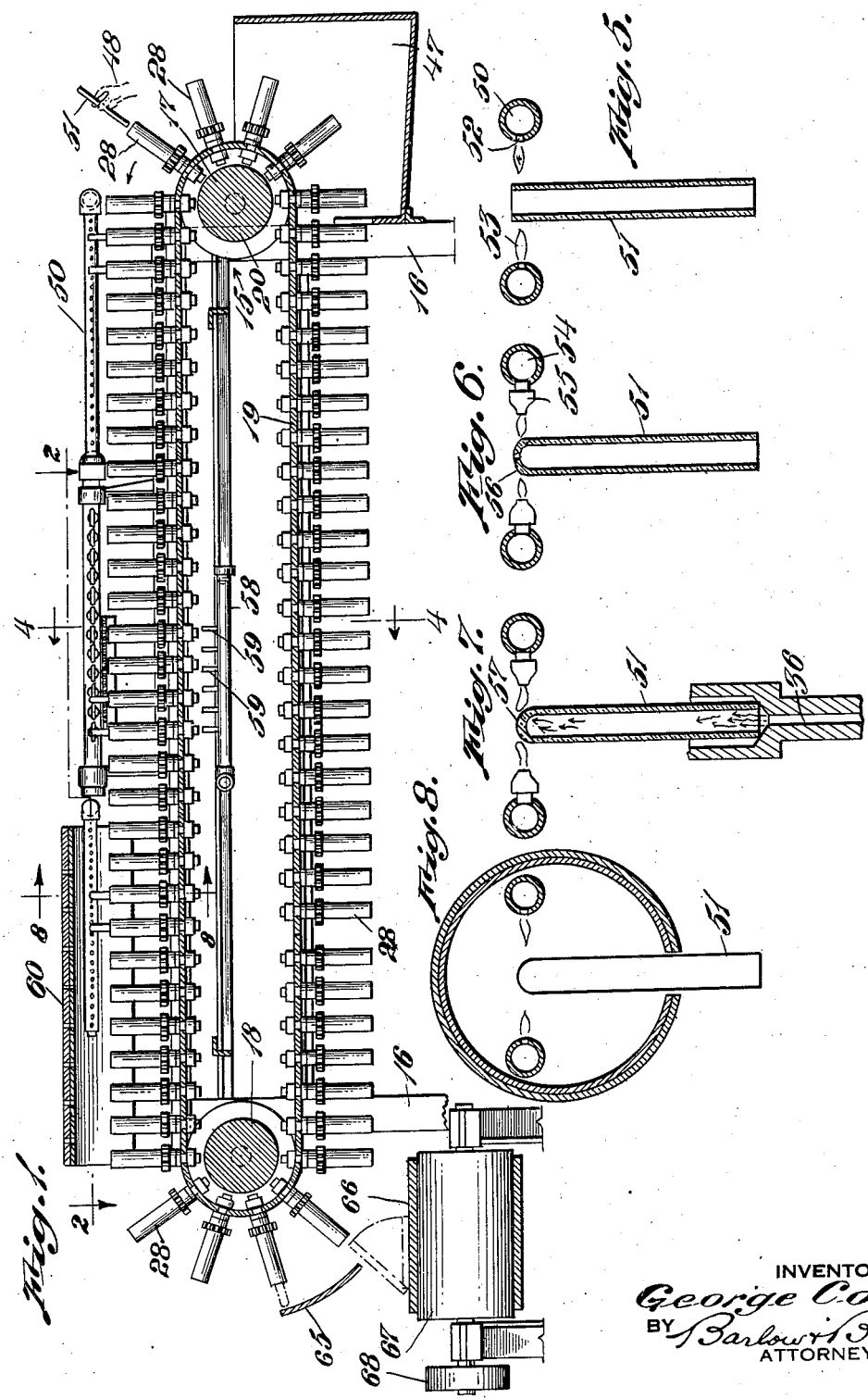
INVENTOR
George Coby
BY Barlow & Barlow
ATTORNEYS May 10, 1949.  G. COBY  2,469,681
GLASS TUBE BOTTOMING MACHINE
Filed May 27, 1943  3 Sheets-Sheet 2
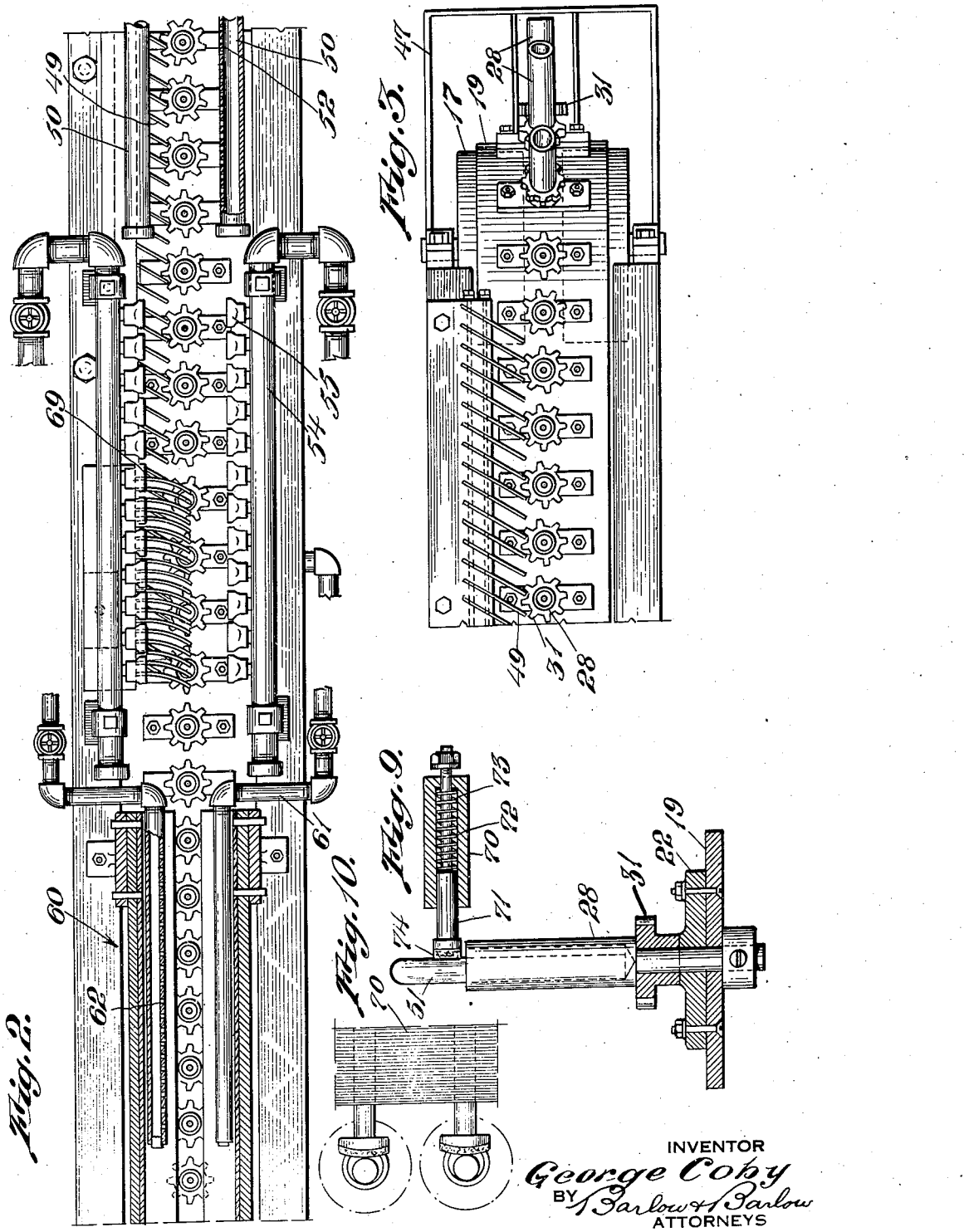
INVENTOR
George Coby
BY Barlow & Barlow
ATTORNEYS May 10, 1949. G. COBY 2,469,681
GLASS TUBE BOTTOMING MACHINE
Filed May 27, 1943 3 Sheets-Sheet 3

INVENTOR
George Coby
BY Barlow & Barlow
ATTORNEYS

Patented May 10, 1949

2,469,681

UNITED STATES PATENT OFFICE 2,469,681

GLASS TUBE BOTTOMING MACHINE

George Coby, Attleboro, Mass., assignor of forty per cent to James V. Pugliese, Providence, R. I.

Application May 27, 1943, Serial No. 488,671

8 Claims. (Cl. 49—7)

This invention relates to an apparatus for the shaping of tubular bodies of a plastic material such as glass which may be heated to a state of plasticity. More particularly the machine deals with the forming of a bottom upon a glass tube or vial.

Heretofore, in the shaping of glass bodies or the bottoming of a glass tube or vial it has been usual to position the tube either in a horizontal position or in a position such that closing takes place at the lower end of the tube, which enables the glass to stretch out and maintain itself in a desirable thin condition. In other instances some assistance to the shaping of the tube is provided either by causing the tube to engage the properly shaped surface or stopping the machine and molding the work while in a stationary position. Each of these performances has certain undesirable results particularly the slow action or slow movement of the work in the machine.

One of the objects of this invention is to provide a machine for forming bottoms on the ends of tubes which machine may be of inexpensive construction and without the necessity of precision functioning of the parts.

Another object of this invention is to accomplish a rotation of carriers for the work at the same time that they are travelling through the machine with inexpensive operating parts and avoiding the necessity of precision operation.

Another object of this invention is to provide a machine in which the desired shaping of a glass tube or placing of a bottom on this tube may be effected during a continuous movement of the body being shaped along a definite path of travel.

Another object of this invention is to seal the upper end of a tube while travelling in a vertical position, in which position the upper end of the tube is readily exposed to view by the operator.

Another object of this invention is to control the thickness of the bottom of the tube while formed with the bottom upwardly and prevent the bottom from becoming unduly thick with consequent strain in the glass.

Another object of this invention is to provide in one continuous movement of the body to be operated on, the heating and closing of the end of the body, the shaping of the end of the body, the reheating and annealing of the end of the body, and the discharge upon a conveyor belt, all without the necessity of manual manipulation, it being merely necessary to feed the body into the machine at one end.

With these and other objects in view, the invention consists of certain novel features of construction, as will be more fully described and particularly pointed out in the appended claims.

In the accompanying drawings:

Fig. 1 is a longitudinal sectional view taken substantially centrally through the machine along line 1—1 of Fig. 4 illustrating the essential operating parts of the machine while omitting certain parts for the sake of clearness;

Fig. 2 is a top plan view of the mid portion of the machine taken substantially along line 2—2 of Fig. 1;

Fig. 3 is a view similar to Fig. 2 illustrating the supply end of the machine;

Figure 4:
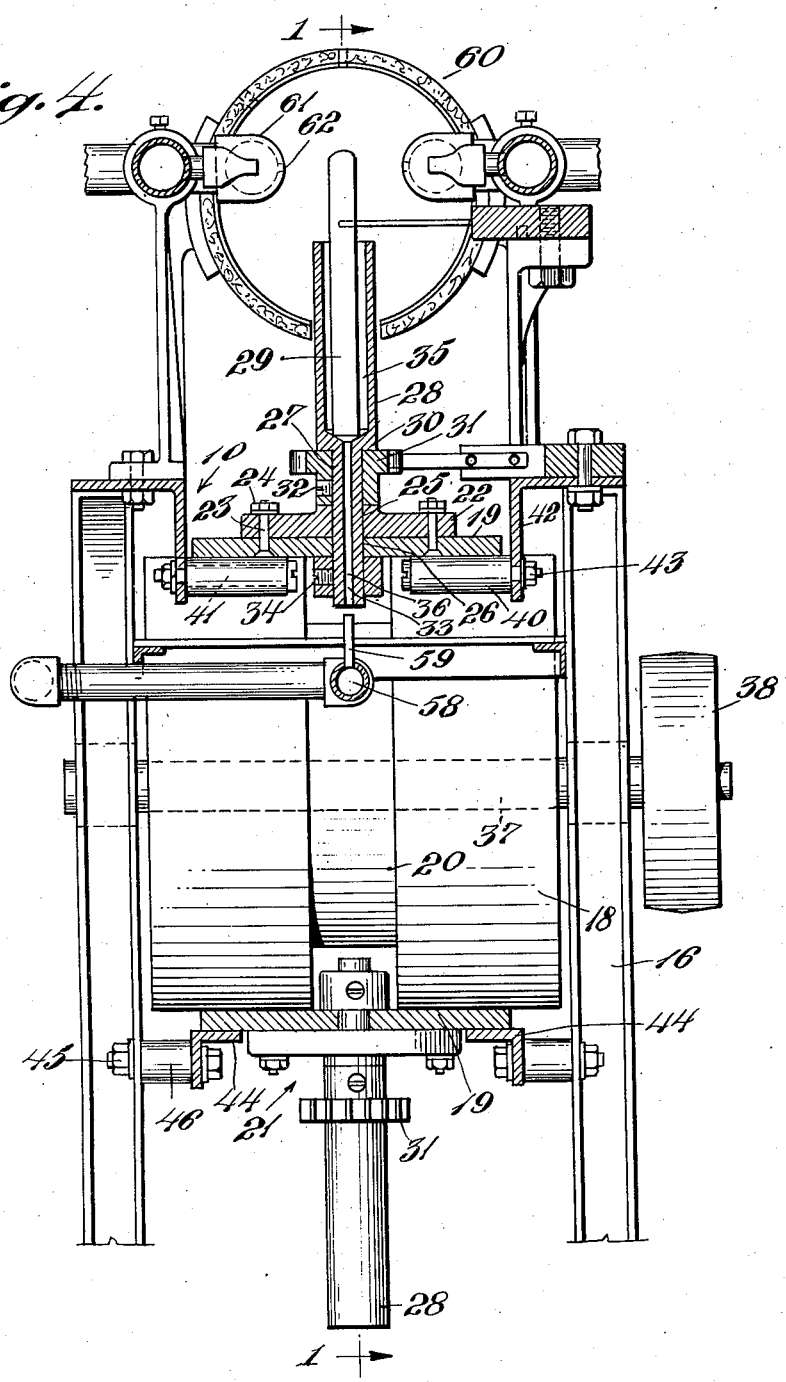
Fig. 4 is an enlarged vertical section at the shaping stage of the machine taken substantially at line 4—4 of Fig. 1.

Figs. 5, 6, and 7 are diagrammatic views in section illustrating different stages of operation upon the work;

Fig. 8 is a sectional view through the re-heating and annealing portion of the device taken substantially along line 8—8 of Fig. 1 showing the tube in elevation after closed;

Fig. 9 is a diagrammatic sectional view illustrating a modified form of holding means engaging the work; and Fig. 10 is a fragmental plan view of the showing of Fig. 9.

In proceeding with this invention I provide a travelling belt which will have its upper and lower spans in substantially horizontal planes. The belt will travel about spaced drums or pulleys which will be arranged to rotate about horizontal axes. At spaced locations along the belt and in tandem relation are provided carriers each equipped to receive one tube to be operated upon, the tube being loaded manually from a conveniently located container which holds a supply of the work. As the work travels the carrier is rotated and heat is supplied to the upper end of the tube to plasticize the same and cause the plastic end to flow inwardly to close the upper end of the tube. Means are provided to blow air into the lower end of the tube to shape the bottom and at the same time hold the tube from being discharged from its carrier, after which the tube is annealed by re-heating and cooling gradually and then discharged onto a conveyor belt for inspection and packaging. The gas and air supplies and the drive of the machine are shown diagrammatically or indicated generally as these are known structures and perform their own functions.

In Fig. 1 there is designated generally a supporting frame work 15 having supporting legs 16 fragmentally shown which framework supports spaced pulleys 17 at one end and 18 at the other end over which there travels a belt 19 of endless formation. Each of these pulleys 17 and 18 are grooved as at 20 for the reception of a part of the carrier designated generally 21 which is fixed to the belt.

This carrier is shown in greater detail in Fig. 4, which illustrates a base 22 secured to the belt 19 by bolts 23 having nuts 24 thereon. The base has an opening 25 therein which registers with an opening 26 in the belt for the reception of the reduced portion 27 of the work container 28 for carrying the tubular work 29. A shoulder 30 is formed by this reduced portion 27 against which the gear 31 abuts and which is held to this portion 27 by set screw 32. Portion 27 below the gear extends through the registering openings 25 and 26 and is held to the belt by a collar 33 and set screw 34 in such a manner that rotation by means of the gear 31 may be had in the base 22 as a bearing. The container recess or bore 35 which receives the work 29 joins a small bore 36 extending axially through the reduced portion 27. This portion which projects below the belt is accommodated in the groove 20 of the pulley.

Drum 18 is driven through a suitable shaft 37 and pulley 38 which latter is engaged by a drive belt for rotating the same.

The conveyor belt 19 travels over roller supports 40 which are rotatably mounted on stub shafts 41 projecting inwardly from the depending brackets rails 42 of the frame and are held in place by nuts 43 engaging these brackets. The lower span of the belt is supported by inwardly projecting tracks 44 which are mounted on the framework by bolts 45 and spacer elements 46 so that the tracks engage the belt as it moves from the discharge end of the machine toward the supply end of the machine for further loading.

A hopper 47 contains a supply of the work to be operated upon such for instance as the open ended tube shown in Fig. 5. The operator will pick from this hopper a tube and place it into one of the bores 35 of the carrier part 28 as shown at 48 in Fig. 1 and the tube will advance through the machine in a position extending beyond the upper edge of the container 28. As the tube travels through the machine, flexible arms 49, as shown in Figs. 2 and 3, engage the gear or projections on the part 31 of the carrier to cause a step by step rotation of the carrier as it moves through the machine.

Gas pipes 50 are oppositely disposed on either side of the upper end of the tube 51 which projects above the carrier container 28. These gas supply tubes with openings 52 therein through which gas is emitted and is lighted so that flames 53 are projected toward the tube 51 as shown in Fig. 5 which commences to heat the tube as it initially starts into the machine. Gas pipes 54 having burners 55 secured thereto are oppositely located at a second stage and supply greater heat to the tube 51 and cause a melting of the glass at the upper end which causes this glass as at 56 (see Fig. 6) to flow inwardly as shown at 57 in Fig. 7 to completely close the end of the tube.

Just after the glass closes the end of the tube, the tube is at a position where from a common supply 58 (see Fig. 1) air jet nozzles 59 cause air to be passed up through the openings 36, as shown in Fig. 4, into the tube as illustrated in Fig. 7. This air causes the bottom 57 to arch upwardly and become somewhat thinner than when initially formed so that the thickness is substantially the same as that of the side walls of the tube 51. The air is supplied through the pipes 58 from any suitable compressor operating continuously. Thus, as the carriers move over the jets 59 some air will be passed up through the opening 36 as the opening comes into registry with the various jets 59 spaced along the tube 58 and thereby supply sufficient air for this shaping purpose.

The tube is then permitted to cool as it passes a short distance where no heat is applied after which it again enters a heating chamber designated generally 60. This chamber consists of some heat insulating covering such as asbestos with gas supply pipes 61 extending thereinto and equipped with openings to project a gas flame 62 toward the work to reheat the tube and then permit it to gradually cool in this oven-like arrangement of cover over the tube which continues its travel therethrough.

When the tube emerges from this annealing oven it further cools in the open air at room temperature and is discharged as the carrier in travelling around the pulley 18 tilts from an upright to an inverted position. A guard 65 may engage the end of the tube to control its dropping position. A travelling conveyor belt 66 will receive the discharge tube and carry it to the desired point. This conveyor consists of a drum 67 driven by a pulley 68 and will permit of inspection of the tube as it travels along the conveyor for discharge into a suitable package for the purpose.

In order to prevent the air which is forced up through the carrier and into the tube from dislodging the tube from the carrier, a plurality of flexible fingers 69 are mounted along the path of travel of the tube so that the tube will engage these fingers and be pressed against the container 28 so as to hold it in position. These fingers will engage the tube throughout the travel of the tube along the blowing means. In some cases, instead of using a flexible finger such as shown at 69, I may mount a block 70 (see Figs. 9 and 10) having a series of plungers 71 each operating in a bore 72 and urged by spring 73 so that the resilient or soft face 74 will press against each of the tubes as it aligns with the blower nozzle so as to press it firmly against the side of the container 28 of the carrier and prevent it from being moved upwardly by air pressure which is supplied for shaping.

I claim:

1. In a machine for closing the end of a tubular glass body, means for moving the tube in a vertical position along a substantially straight path, units positioned adjacent to said path for providing a zone of heat into which the upper end of the tube travels for softening the end thereof sufficiently to cause the same to flow inwardly and close the end of the tube and means positioned below the tube and in line with the path of travel thereof for discharging air under pressure into the tube while moving to shape the closed end of the tube while in a moldable condition, said air pressure being the only means for shaping the softened end portion of the tube.

2. In a machine for closing the end of a tubular glass body, a carrier for the tube, means for supporting the tube in a vertical position in the carrier, means for moving the carrier along a substantially straight path, means to rotate the carrier as advanced in said path, heating units positioned adjacent to said path for providing a zone of heat into which the upper end of the tube travels for softening the end thereof sufficiently to cause the same to flow inwardly and close the end of the tube and means positioned below the tube and in line with the path of travel thereof for discharging air under pressure into the tube while moving to shape the closed end of the tube while in a moldable condition, said air pressure being the only means for shaping the softened end portion of the tube.

3. In a machine for closing the end of a tubular glass body, means for moving the tube in a vertical position along a substantially straight path, oppositely disposed heating units on either side of the path of travel of the tube for heating the upper end of the tube sufficiently to cause the end thereof to flow inwardly and close the end of the tube and means positioned below the tube and in line with the path of travel thereof for discharging air under pressure into the tube while moving to shape the closed end of the tube while in a moldable condition, said air pressure being the only means for shaping the softened end portion of the tube.

4. In a machine as defined in claim 2 in which the carrier is mounted on a travelling belt, means for engaging the carrier and rotating the same relative to said belt as the carrier is advanced.

5. In a machine for closing the end of a tubular glass body, means for closing the end of the tube including a carrier for holding the body in vertical position, a travelling endless belt upon which said carrier is mounted, said carrier and belt having registering vertical openings through which air may be discharged into said tube and means positioned between the belt and in line with the path of travel of the opening to discharge air through said openings while said carrier is moving.

6. In a machine as defined in claim 1 in which means are provided for engaging said tube and preventing lifting of the same by the air discharged thereinto.

7. In a machine for closing the end of a tubular glass body, a carrier for holding the body in vertical position, a travelling belt upon which said carrier is mounted, heating units adjacent said belt and at a location for softening the upper end portion of the tube sufficiently to cause the same to flow inwardly to close the end of the tube, said carrier and belt having registering vertical openings through which air under pressure may be discharged into said tube to shape the closed end thereof, means positioned below said carrier and in line with the path of travel of said opening to discharge air therethrough into said tube while moving, and means for engaging said tube and preventing lifting of the same by the air discharged thereinto.

8. In a machine as defined in claim 7 in which flexible fingers are provided engaging the tube for preventing lifting of the same by the air discharged thereinto.

GEORGE COBY.

REFERENCES CITED

The following references are of record in the file of this patent:

UNITED STATES PATENTS

| Number | Name | Date |
| --- | --- | --- |
| 834,275 | Dorer | Oct. 30, 1906 |
| 854,836 | Owens | May 28, 1907 |
| 1,135,640 | Watson | Apr. 13, 1915 |
| 1,566,563 | Ross | Dec. 22, 1925 |
| 1,577,581 | Knight | Mar. 23, 1926 |
| 1,832,039 | Millar | Nov. 17, 1931 |
| 1,838,161 | Soubier | Dec. 29, 1931 |
| 1,859,011 | Wales | May 17, 1932 |
| 1,967,603 | Zimber | July 24, 1934 |
| 2,146,572 | Hahn et al. | Feb. 7, 1939 |
| 2,151,191 | Crane et al. | Mar. 21, 1939 |
| 2,266,417 | Eisler | Dec. 16, 1941 |
| 2,301,940 | Fries | Nov. 17, 1942 |

FOREIGN PATENTS

| Number | Country | Date |
| --- | --- | --- |
| 282,057 | Great Britain | Mar. 22, 1928 |
| 488,710 | France | July 16, 1918 |